Sept. 14, 1926.
H. J. KRONSBEIN
CULTIVATOR ATTACHMENT
Filed Nov. 3, 1925
1,599,821
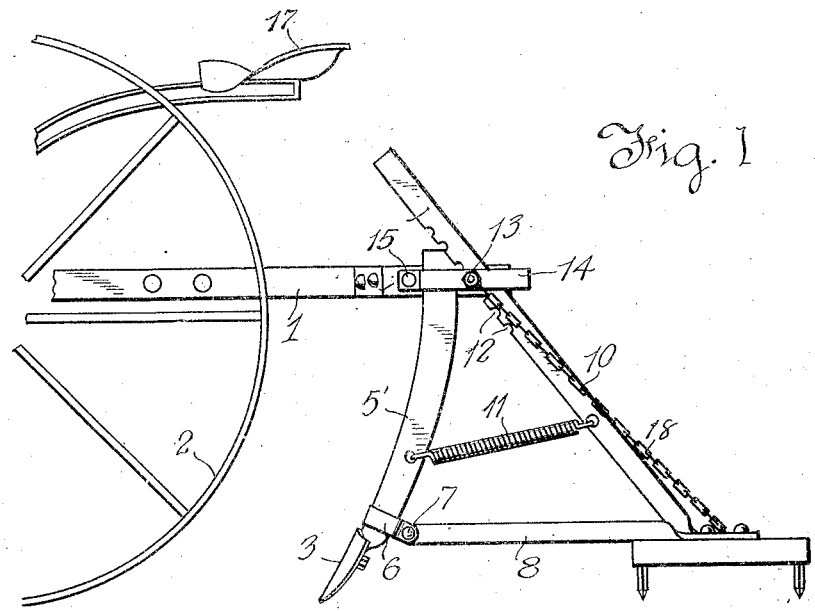
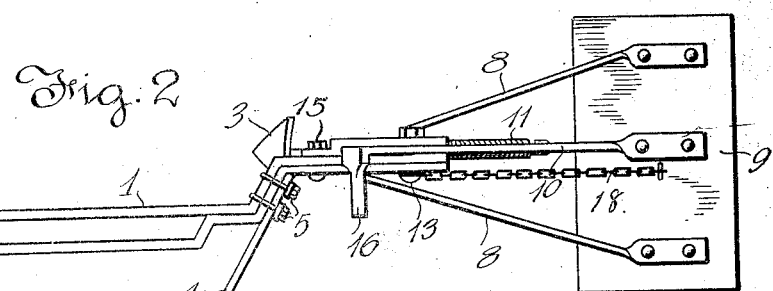
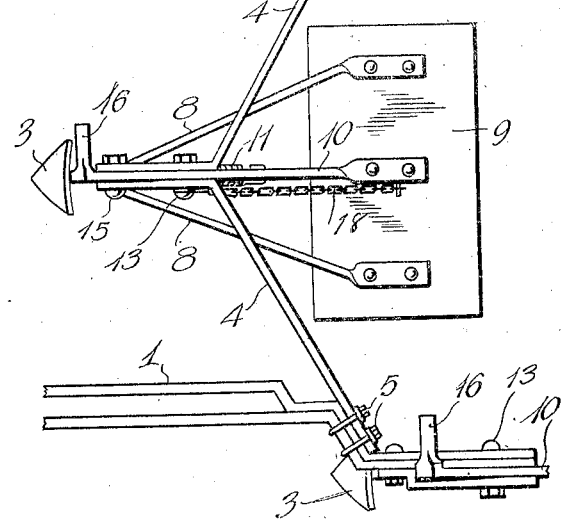
Inventor
Henry J. Kronsbein
By E. K. Bond
Attorney Patented Sept. 14, 1926.

1,599,821

UNITED STATES PATENT OFFICE.

HENRY J. KRONSBEIN, OF CONCORDIA, MISSOURI.

CULTIVATOR ATTACHMENT.

Application filed November 3, 1925. Serial No. 66,531.

This invention relates to certain new and useful improvements in cultivator attachments and it has for its objects among others to provide a simple, yet efficient, means readily attachable to a one-row corn cultivator so as to make it a three-row bean plow attachment or it can be applied to a one-row cultivator.

It has for a further object to provide simple means readily attachable to different forms of cultivators whereby I can readily provide a three-shovel and a three-row bean cultivator or a one- or two-row bean cultivator, as may be desired.

With devices so far as I am aware such as has been heretofore devised, thirty inches has been as close as beans are planted that could be cultivated with a corn cultivator. By my improvement I have in actual practice taken a corn planter set to seed forty-two inches apart and planted beans half a day, then gone back and straddled each row and thus planted rows of beans twenty-one inches apart. The shovels are twelve inches and the sweeps twenty-one inches apart with the harrows sixteen inches and following each sweep which makes a perfect job of cultivation.

A further object is to provide for the lifting and lowering and setting of the harrows at any depth from the seat of the cultivator without interfering in any way with the operation or stopping the movement of the cultivator.

Other objects and advantages of the invention will hereinafter appear and the novel features thereof will be particularly pointed out in the appended claims.

The invention is clearly illustrated in the accompanying drawing, which, with the numerals of reference marked thereon, forms a part of this specification, and in which Figure 1 is a detail in side elevation with parts broken away.

Figure 2 is a top plan.

Like numerals of reference indicate like parts throughout the different views.

Referring to the drawing, 1 designates the beams of a cultivator of any well-known or approved form of construction, 2 being one of the wheels.

3 are the plows, in the present instance shown as being three in number, although it is evident that the attachment is equally applicable to a one, two or three-shovel cultivator.

4, 4 are beams attachable to the beams 1, 1, as seen in Figure 2, in the present instance suitable clamps, as 5, 5, being employed for this purpose.

The plow standards 5' are mounted upon the standards 1 in any well-known manner and near the lower end of each plow standard 5' is attached a saddle or the like 6 to which is pivotally connected, as at 7, the rearwardly extending members 8, as seen best in Figure 1. The members 8 are attached to the harrow 9 in any suitable manner, while the member 10 is secured at one end to the harrow member 9, as seen in Figure 2, the member 10 being connected between its upper and lower ends to the plow standard 5' by means of a spring 11, shown best in Figure 1. The member 10 is provided upon its under side with teeth or notches 12 which are designed for cooperation with a transverse pin or the like 13 carried in the guide member 14 secured as at 15 to the beam 1. The upper end of the member 10 is provided with a handle portion 16, as seen in Figure 2, whereby the harrow member may be readily raised or lowered by rearward movement of the upper end of the member 10 and then moving the same up or down as occasion may require, and when in the desired position moving the upper end of the member 10 forward, when the spring 11 serves to hold the parts in their adjusted position. These handles 16 are arranged within convenient reach of the driver on the seat 17 and permit of ready setting of the harrow at the desired depth and easily raising or lowering the same independently of the sweeps of the cultivator. Each harrow is adjustable independently of the other, as will be readily understood upon reference to Figure 2. In use, the harrows follow the shovels, and the wheels of the cultivator and the horses will straddle two rows of beans. The springs 11 tend to keep the harrows down to their work and readily yield when it is desired to adjust the depth of such harrows, the pivots 7 allowing of the requisite movement of the members 8 and 10 for the necessary adjustment as to the depth of the harrows.

Modifications in details may be resorted to without departing from the spirit of this invention or sacrificing any of its advantages.

A chain 18 is sometimes employed as shown, attached at one end to a harrow and at the other to the bolt 13. This serves an important function in that by disengaging its upper end when running on uneven ground and the harrow is left to run free and to work up and down which will do good work on rough fields. When the chain is hooked up the harrow can be raised and lowered with the shovel.

Furthermore, the beams 4 are adjustably held by the clamps 5 so that they may be adjusted toward or from each other to allow of greater or less distance between the shovels as occasion may require, so I may cultivate beans twenty, twenty-one, twenty-two, twenty-three, or twenty-four inches apart. By loosening the bolts of these clamps the shovels may be moved closer together or farther apart as may be desired.

What is claimed as new is:—

1. A cultivator attachment embodying a harrow member, a forwardly inclined member attached at its lower end to said harrow member and at its upper end notched and cooperating with means on the cultivator beam, a plow standard, and a spring connecting the inclined member with the plow standard at a point below the connection of the latter with the cultivator beam, and a pivotal connection between the harrow attachment and the cultivator standard.

2. A cultivator attachment embodying a harrow member, members attached thereto to be mounted for pivotal movement, an adjusting member fixedly attached at one end to said harrow member, and a spring acting on said adjusting member above the pivot thereof.

3. A cultivator attachment embodying a harrow member, members attached thereto to be mounted for pivotal movement, an adjusting member fixedly attached at one end to said harrow member, a spring acting on said adjusting member above the pivot thereof, and a guide and holding means for the upper end of said adjusting member.

4. An agricultural implement embodying cultivator beams carrying shovels, plow standards, harrow members arranged to the rear of the standards, and inclined beams supported from the cultivator beams and in turn supporting the harrow members, the harrow members being pivotally supported on the plow standards, vertically adjustably connected with the plow beams of the cultivator, said inclined beams being resiliently connected with the plow standards.

In testimony whereof I affix my signature.

HENRY J. KRONSBEIN.